(12) United States Patent
Suzuki et al.

(10) Patent No.: US 8,961,367 B2
(45) Date of Patent: Feb. 24, 2015

(54) VEHICLE DRIVE APPARATUS

(71) Applicant: JTEKT Corporation, Osaka (JP)

(72) Inventors: Kunihiko Suzuki, Gamagori (JP); Keita Nomura, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/013,401

(22) Filed: Aug. 29, 2013

(65) Prior Publication Data
US 2014/0066252 A1    Mar. 6, 2014

(30) Foreign Application Priority Data

Sep. 5, 2012 (JP) ................... 2012-195212

(51) Int. Cl.
| | | |
|---|---|---|
| *B60W 10/04* | (2006.01) | |
| *B60W 10/10* | (2012.01) | |
| *B60W 10/11* | (2012.01) | |
| *B60W 10/06* | (2006.01) | |
| *B60K 6/48* | (2007.10) | |
| *B60K 6/52* | (2007.10) | |
| *B60W 10/02* | (2006.01) | |
| *B60W 10/08* | (2006.01) | |
| *B60W 20/00* | (2006.01) | |

(52) U.S. Cl.
CPC ............ *B60W 10/11* (2013.01); *B60W 10/06* (2013.01); *B60K 6/48* (2013.01); *B60K 6/52* (2013.01); *B60W 10/02* (2013.01); *B60W 10/08* (2013.01); *B60W 20/40* (2013.01); *B60W 2710/081* (2013.01); *B60W 2710/083* (2013.01); *Y02T 10/6221* (2013.01); *Y02T 10/6265* (2013.01)
USPC .......................................... 477/109; 475/223

(58) Field of Classification Search
USPC .......... 475/5, 163, 221, 223, 331; 477/77, 80, 477/83, 84, 87, 90, 91, 107, 109, 181, 179
See application file for complete search history.

(56) References Cited

U.S. PATENT DOCUMENTS 4,625,584 A * 12/1986 Onodera ........................ 475/160
6,679,133 B1 * 1/2004 Kayano et al. ................. 74/335
(Continued)

FOREIGN PATENT DOCUMENTS

JP    2008-185078    8/2008

OTHER PUBLICATIONS

U.S. Appl. No. 14/013,529, filed Aug. 29, 2013, Suzuki, et al.

*Primary Examiner* — Justin Holmes
(74) *Attorney, Agent, or Firm* — Oblon, Spivak, McClelland, Maier & Neustadt, L.L.P.

(57) ABSTRACT

A driving force transmission apparatus includes a linkage mechanism that is able to carry out switchover between a connected state where first and second intermediate shafts are connected to each other so as to be non-rotatable relative to each other to transmit torque output from an electric motor to a rear wheel, and a disconnected state where the first and second intermediate shafts are disconnected from each other. When switching the driving force transmission apparatus from the connected state to the disconnected state, a control unit reduces the torque that is generated by the motor during a drive state where the torque output from the motor is transmitted from the first intermediate shaft to the second intermediate shaft, and switches the driving force transmission apparatus from the connected state to the disconnected state by controlling the linkage mechanism while the torque that is generated by the motor has been reduced.

7 Claims, 8 Drawing Sheets

(56) References Cited

U.S. PATENT DOCUMENTS

| | | | |
|---|---|---|---|
| 7,115,065 B2* | 10/2006 | Tabata et al. | 477/3 |
| 7,247,117 B2* | 7/2007 | Forster | 475/221 |
| 8,523,738 B2* | 9/2013 | Morscheck et al. | 477/77 |
| 8,556,760 B2* | 10/2013 | Mack et al. | 475/152 |
| 2008/0182712 A1 | 7/2008 | Kira et al. | |
| 2009/0137362 A1* | 5/2009 | Yonezawa et al. | 477/5 |
| 2010/0082210 A1* | 4/2010 | Kobayashi et al. | 701/66 |
| 2012/0022751 A1* | 1/2012 | Matsuda | 701/54 |
| 2012/0259494 A1* | 10/2012 | Schaeffer et al. | 701/22 |
| 2012/0323418 A1* | 12/2012 | Sah et al. | 701/22 |

* cited by examiner

VEHICLE DRIVE APPARATUS

INCORPORATION BY REFERENCE

The disclosure of Japanese Patent Application No. 2012-195212 filed on Sep. 5, 2012 including the specification, drawings and abstract, are incorporated herein by reference in its entirety.

BACKGROUND OF THE INVENTION

1. Field of the Invention

The invention relates to a vehicle drive apparatus that drives wheels by using motor torque.

2. Description of the Related Art

Conventionally, there has been known a four-wheel-drive vehicle configured such that main drive wheels, which are either front wheels or rear wheels, are driven by an internal combustion engine (engine), and auxiliary drive wheels, which are the wheels other than the main drive wheels, are drive by an electric motor. A vehicle drive apparatus mounted in the four-wheel-drive vehicle of this kind is described in, for example, Japanese Patent Application Publication No. 2008-185078 (JP 2008-185078 A).

The vehicle drive apparatus described in JP 2008-185078 A includes an electric motor (motor), a speed reducer, a differential, and a connection-disconnection mechanism. The speed reducer reduces the speed of rotation output from the electric motor. The differential distributes the output from the electric motor to right and left wheels after the speed is reduced by the speed reducer. The connection-disconnection mechanism connects (interconnects) one of a pair of side gears, serving as output members of the differential, and the wheel (left rear wheel) to each other, and disconnects the one of the side gears and the wheel from each other.

The connection-disconnection mechanism includes a first spline gear on the side gear side, a second spline gear on the wheel side, and a synchro sleeve movable in the direction of the axle shafts. When the synchro sleeve meshes with both the first spline gear and the second spline gear in the connection-disconnection mechanism, the side gear and the wheel are connected to each other so that torque is allowed to be transmitted therebetween. The connection-disconnection mechanism is configured such that the side gear and the wheel are disconnected from each other when the mesh of the synchro sleeve with the first and second spline gears is cancelled.

However, in the vehicle drive apparatus described in JP 2008-185078 A, when the synchro sleeve is moved while torque is being transmitted between the first spline gear and the second spline gear, it is necessary to push the synchro sleeve against the force of friction between internal splines of the synchro sleeve and the first and second spline gears. Because the force of friction changes on the basis of the torque output from the electric motor, the capacity of a mechanism (hydraulic circuit) that moves the synchro sleeve needs to be large, taking into account the maximum output torque of the electric motor. This becomes a factor of increases in cost and weight of the apparatus. Furthermore, if the force that pushes the synchro sleeve is not sufficiently large with respect to the force of friction that is generated in accordance with the movement of the synchro sleeve, it is not possible to move the synchro sleeve quickly.

SUMMARY OF THE INVENTION

One object of the invention is to provide a vehicle drive apparatus that makes it possible to smoothly switch a rotary member that transmits driving force, from a connected state to a disconnected state while suppressing increases in cost and weight of the apparatus.

An aspect of the invention relates to a vehicle drive apparatus, including: a motor that generates torque used as driving force for a vehicle; a driving force transmission apparatus that transmits torque output from the motor to a wheel; and a control unit that controls the motor and the driving force transmission apparatus. The driving force transmission apparatus includes a linkage mechanism that is able to carry out switchover between a connected state where a first rotary member on the motor side and a second rotary member on the wheel side are connected to each other so as to be non-rotatable relative to each other to transmit the torque output from the motor to the wheel, and a disconnected state where the first rotary member and the second rotary member are disconnected from each other. When switching the driving force transmission apparatus from the connected state to the disconnected state, the control unit reduces the torque that is generated by the motor during a drive state where the torque output from the motor is transmitted from the first rotary member to the second rotary member, and switches the driving force transmission apparatus from the connected state to the disconnected state by controlling the linkage mechanism while the torque that is generated by the motor has been reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a vehicle drive apparatus according to an embodiment of the invention will be described in detail with reference to FIG. 1 to FIG. 8C.

Figure 1:
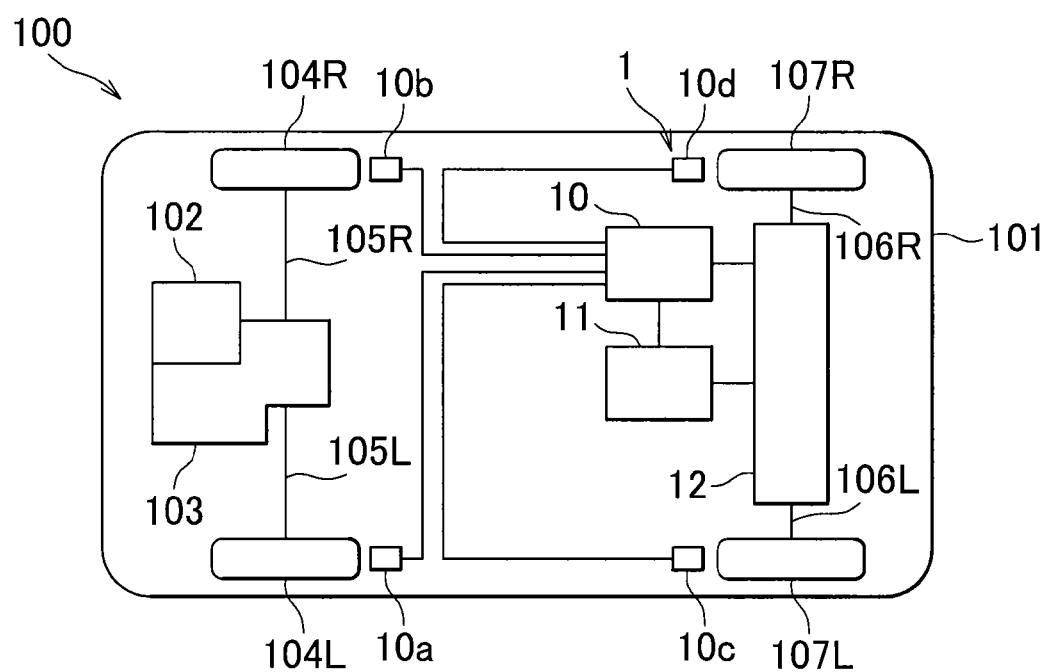
FIG. 1 is a diagram showing the schematic structure of a four-wheel-drive vehicle in which a drive apparatus according to an embodiment of the invention is mounted.

FIG. 1 shows the schematic structure of a four-wheel-drive vehicle 100 in which a drive apparatus 1 (vehicle drive apparatus) according to an embodiment of the invention is mounted. As shown in FIG. 1, in the four-wheel-drive vehicle 100, a front wheel-side drive power system and a rear wheel-side drive power system are mounted in a vehicle body 101. The front wheel-side drive power system has an engine 102 as a drive source. The rear wheel-side drive power system has an electric motor as a drive source. The front wheel-side drive power system includes the engine 102, a transaxle 103, and a pair of front axle shafts 105R, 105L. The transaxle 103 changes the speed of rotation output from the engine 102, and then distributes the driving force to the front axle shafts 105R, 105L. The front axle shafts 105R, 105L transmit the outputs from the transaxle 103 to a right front wheel 104R and to a left front wheel 104L, respectively.

The drive apparatus 1 is disposed in the rear wheel-side drive power system of the four-wheel-drive vehicle 100, and is supported by the vehicle body 101 of the four-wheel-drive vehicle 100. The output from the drive apparatus 1 is transmitted to a right rear wheel 107R and a left rear wheel 107L via a pair of rear axle shafts 106R, 106L, respectively. The drive apparatus 1 includes an electric motor 11, a driving force transmission apparatus 12, and a control unit 10. The electric motor 11 generates torque as driving force for the four-wheel-drive vehicle 100. The driving force transmission apparatus 12 transmits torque output from the electric motor 11 to the right and left rear wheels 107R, 107L via the rear axle shafts 106R, 106L, respectively. The control unit 10 controls the electric motor 11 and the driving force transmission apparatus 12.

The control unit 10 has a central processing unit (CPU), an output circuit, and the like. The CPU executes processes according to programs stored in a memory element. The output circuit outputs motor current to the electric motor 11 and an electric motor 50 (described later) included in the driving force transmission apparatus 12. Furthermore, rotational speed sensors 10b, 10a, 10d, 10c that detect the rotational speeds of the right and left front wheels 104R, 104L and the right and left rear wheels 107R, 107L are connected to the control unit 10. The control unit 10 is able to detect the rotational speeds of the wheels with the use of the rotational speed sensors 10a to 10d.

Figure 2:
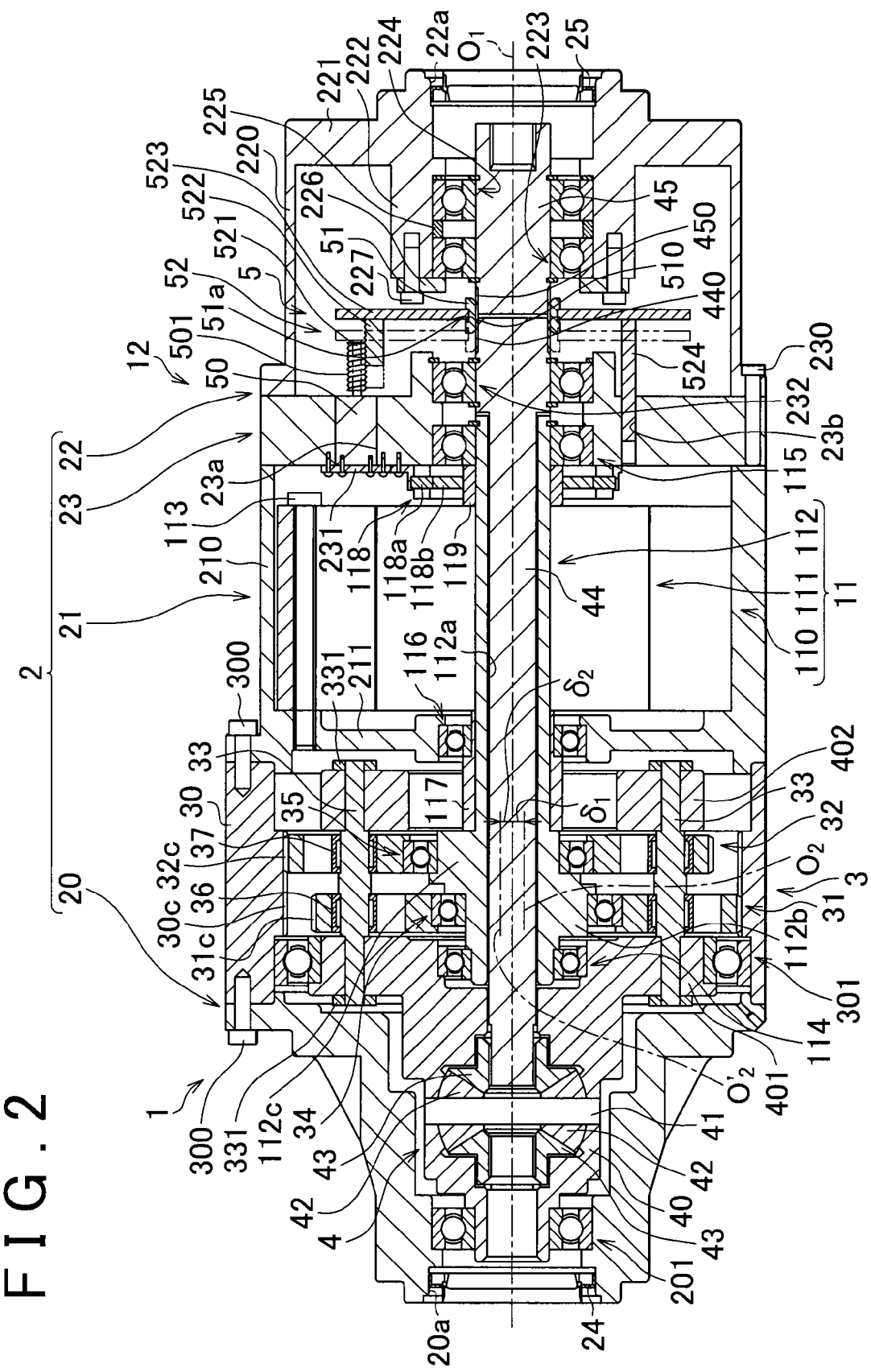
FIG. 2 is a sectional view showing an example of the structure of an electric motor and a driving force transmission apparatus that are provided in the drive apparatus.

FIG. 2 is a sectional view showing an example of the structure of the electric motor 11 and the driving force transmission apparatus 12 of the drive apparatus 1.

The driving force transmission apparatus 12 has a hollow housing 2, a speed reduction mechanism 3, a rear differential 4, and a linkage mechanism 5. The housing 2 is fixed to the vehicle body 101. The speed reduction mechanism 3 reduces the speed of rotation output from the electric motor 11. The rear differential 4 distributes the torque output from the electric motor 11, after speed reduction by the speed reduction mechanism 3, to the rear axle shafts 106R, 106L while allowing differential rotations. The linkage mechanism 5 is able to cut off the connection between the rear axle shaft 106R and one of a pair of output members of the rear differential 4. In the present embodiment, the electric motor 11 is housed in the housing 2.

The housing 2 has a tubular rotation force applying member 30 (described later), and also has a first housing element 20, a second housing element 21, a third housing element 22 and a fourth housing element 23. The rotation force applying member 30 constitutes the speed reduction mechanism 3. The first housing element 20 houses the rear differential 4. The second housing element 21 houses the electric motor 11. The third housing element 22 opens toward the second housing element 21 side. The fourth housing element 23 is interposed between the third housing element 22 and the second housing element 21. The first to fourth housing elements 20 to 23 are disposed along a rotation axis $O_1$ of the electric motor 11.

Hereinafter, the direction parallel to the rotation axis $O_1$ will be referred to as "axial direction".

The first housing element 20 is disposed at one side of the housing 2 in the axial direction (at the left side in FIG. 2). The first housing element 20 is formed of a stepped cylindrical member that has a large-diameter opening portion located on the second housing element 21 side, and a small-diameter opening portion located on the opposite side of the first housing element 20 from the large-diameter opening portion. The small-diameter opening portion of the first housing element 20 is formed as a shaft insertion hole 20a through which the rear axle shaft 106L is passed. Inside the shaft insertion hole 20a, there is disposed a seal member 24 that seals a space between an inner peripheral face of the small-diameter portion, which defines the shaft insertion hole 20a, and an outer peripheral face of the rear axle shaft 106L.

The second housing element 21 is a single-piece member having a tubular portion 210 and an inner flange 211. The tubular portion 210 opens toward both sides in the axial direction. The inner flange 211 is formed at one opening portion of the tubular portion 210 (the opening portion on the first housing element 20 side), and protrudes inward from an inner face of the tubular portion 210.

The third housing element 22 is disposed at the other side of the housing 2 in the axial direction (the right side in FIG. 2). The third housing element 22 is a single-piece member having a cylindrical portion 220 and a bottom portion 221. The cylindrical portion 220 opens toward the second housing element 21. The bottom portion 221 is formed at one end of the cylindrical portion 220. In the bottom portion 221, there is formed a shaft insertion hole 22a through which the rear axle shaft 106R is passed. A cylindrical portion 222, which protrudes from the bottom portion 220 toward the electric motor 11 and to which a bearing is fitted, is formed integrally with the bottom portion 221 so as to surround the inner opening of the shaft insertion hole 22a. Inside the shaft insertion hole 22a, there is disposed a seal member 25 that seals a space between an inner peripheral face of the bottom portion 221, which defines the shaft insertion hole 22a, and an outer peripheral face of the rear axle shaft 106R.

The fourth housing element 23 is interposed between the second housing element 21 and the third housing element 22, and is fixed with a fitting bolt 230. The fourth housing element 23 is formed of an annular plate member having a predetermined thickness. In the fourth housing element 23, there is formed a fitting hole 23a for fitting of the electric motor 50 provided as a drive source of the linkage mechanism 5 (described later). The fitting hole 23a extends through the fourth housing element 23 in its thickness direction. Furthermore, a stator 118a of a resolver 118 that detects the rotation angle of the electric motor 11 is fitted, via a fixture member 231, to an electric motor 11-side side face of the fourth housing element 23.

The electric motor 11 includes a stator 110, a rotor 111 and a motor shaft 112. The stator 110 of the electric motor 11 is connected to the control unit 10, and is supplied with motor current from the control unit 10 to generate a magnetic field that rotates the rotor 111. The motor shaft 112 is fixed to an inner periphery of the rotor 111. The motor shaft 112 extends in the axial direction through a center portion of the inner flange 211 of the second housing element 21. The stator 110 is fixed to the inner flange 211 of the second housing element 21 with a bolt 113.

The motor shaft 112 has a tubular shape, and has an insertion hole 112a at its center portion. The insertion hole 112a extends in the axial direction, and a first intermediate shaft 44 is passed through the insertion hole 112a. One axial end portion of the motor shaft 112 is supported by a bearing 114 disposed between the one end portion and a differential case 40 of the rear differential 4. The other axial end portion of the motor shaft 112 is supported by a bearing 115 disposed between the other end portion and the fourth housing element 23. An axial center portion of the motor shaft 112 is rotatably supported by the inner flange 211 of the second housing element 21 via a bearing 116 and a sleeve 117.

An eccentric portion 112b and an eccentric portion 112c, both of which are circular in planar view, are formed integrally with the one end portion of the motor shaft 42. The eccentric portion 112b has an axis $O_2$ that is parallel to the rotation axis $O_1$ and is offset from the rotation axis $O_1$ by an eccentric amount $\delta_1$. The eccentric portion 112c has an axis $O'_2$ that is parallel to the rotation axis $O_1$ and is offset from the rotation axis $O_1$ by an eccentric amount $\delta_2$ ($\delta_1 = \delta_2 = \delta$). The eccentric portion 112b and the eccentric portion 112c are arranged so as to be next to each other along the rotation axis $O_1$ and apart from each other in the circumferential direction around the rotation axis $O_1$ at equal intervals (180°).

A rotor 118b of the resolver 118 is fitted to the other end portion of the motor shaft 112 via a sleeve 119. The resolver 118 outputs, to the control unit 10, a signal corresponding to the rotation angle of the rotor 118b relative to the stator 118a. On the basis of the signal, the control unit 10 is able to detect the rotational speed of the electric motor 11 (the rotational speed of the rotor 111 relative to the stator 110).

Figure 3:
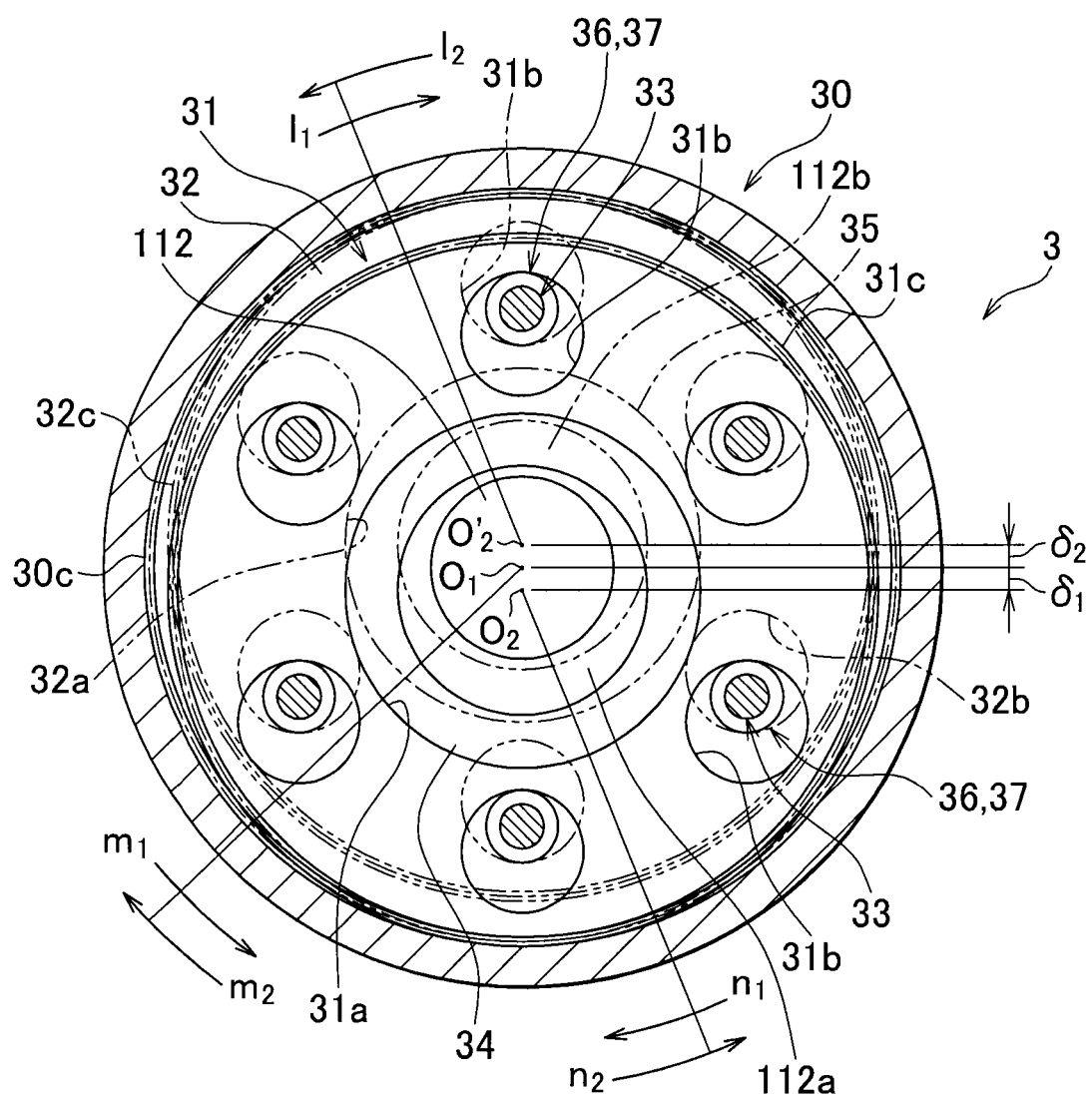
FIG. 3 is an explanatory view showing the structure of a speed reduction mechanism as viewed from the axial direction.

FIG. 3 is an explanatory view showing the structure of the speed reduction mechanism 3 as viewed from the axial direction.

In the present embodiment, the speed reduction mechanism 3 is formed as an involute-gear speed reduction mechanism with a small teeth number difference. The speed reduction mechanism 3 has the rotation force applying member 30, a pair of input members 31, 32, and a plurality of shaft-shaped output members 33. The speed reduction mechanism 3 is disposed between the rear differential 4 and the electric motor 11.

The input member 31 is formed of an external gear that has a center hole 31a of which the central axis coincides with the axis $O_2$. The input member 31 is supported at its inner periphery, which defines the center hole 31a, by an outer peripheral face of the eccentric portion 112b via a bearing 34. The input member 31 receives torque from the electric motor 11 via the eccentric portion 112b of the motor shaft 112 and the bearing 34, and makes circular motion (revolving motion about the rotation axis $O_1$) in the directions of the arrows $m_1$, $m_2$ with the eccentric amount $\delta$.

The input member 31 has a plurality of (six, in the present embodiment) pin insertion holes (through-holes) 31b that are arranged at equal intervals about the axis $O_2$. The output members 33 are passed through the pin insertion holes 31b. A needle roller bearing 36 is disposed on an outer periphery of each output member 33. The hole diameter of each pin insertion holes 31b is set to a value that is larger than the outside diameter of each needle roller bearing 36.

External teeth 31c having an involute tooth profile with a pitch circle of which the central axis coincides with the axis $O_2$, are formed on an outer periphery of the input member 50. The number of teeth $Z_1$ of the external teeth 31c is set as, for example, $Z_1 = 195$.

The input member 32 is formed of an external gear that has a center hole 32a of which the central axis coincides with the axis $O'_2$, and that is symmetric in shape to the input member 31. The input member 32 is disposed so as to be closer to the electric motor 11 than the input member 31. Furthermore, the input member 32 is rotatably supported, at its inner periphery which defines the center hole 32a, by an outer peripheral face of the eccentric portion 112c via a bearing 35. The input member 32 makes circular motion (revolving motion about the rotation axis $O_1$) in the directions of the arrows $m_1$, $m_2$ with the eccentric amount $\delta$, upon reception of motor torque from the electric motor 11.

The input member 32 has a plurality of pin insertion holes 32b that are arranged at equal intervals about the axis $O'_2$. The output members 33 are passed through the pin insertion holes 32b. A needle roller bearing 37 is disposed on an outer periphery of each output member 33. External teeth 32c having an involute tooth profile with a pitch circle of which the central axis coincides with the axis $O'_2$, are formed on an outer periphery of the input member 32. The number of teeth $Z_2$ of the external teeth 32c is equal to the number of teeth $Z_1$ of the external teeth 31c of the input member 31.

The rotation force applying member 30 is formed of an internal gear of which the central axis coincides with the rotation axis $O_1$, is disposed between the first housing element 20 and the second housing element 21, and is fixed with bolts 300. The rotation force applying member 30 meshes with the input members 31, 32. The rotation force applying member 30 applies rotation force in the direction of arrows $n_1$, $n_2$ to the input member 31 that receives motor torque from the electric motor 11 to revolve about the axis $O_2$, and applies rotation force in the directions of arrows $l_1$, $l_2$ to the input member 32 that receives motor torque from the electric motor 11 to revolve about the axis $O'_2$.

An inner peripheral face of the rotation force applying member 30 has internal teeth 30c that mesh with the external teeth 31c of the input member 31 and the external teeth 32c of the input member 32. The number of teeth $Z_3$ of the internal teeth 30c is set as, for example, $Z_3 = 208$. The speed reduction ratio $\alpha$ of the speed reduction mechanism 3 is calculated according to $\alpha = Z_1/(Z_3 - Z_1)$.

The output members 33 are disposed at equal intervals about the rotation axis $O_1$. The output members 33 extend through the pin insertion holes 31b of the input member 31 and the pin insertion holes 32b of the input member 32. One end of each output member 33 is fixed to a first flange 401 of the differential case 40 with a nut 331, and the other end thereof is fixed to a second flange 402 with a nut 331. The output members 33 receive, from the input members 31, 32, rotation forces applied by the rotation force applying member 30, and output the rotation force to the differential case 40 as torque of the differential case 40.

The rear differential 4 is formed of a bevel gear differential gear mechanism that includes the differential case 40, a pinion shaft 41, a pair of pinion gears 42, and side gears 43. The pinion shaft 41 is fixed to the differential case 40. The pinion gears 42 are rotatably supported by the pinion shaft 41. The side gears 43 are a pair of output members that mesh with the pinion gears 42. Due to this structure, the rear differential 4 transmits torque output from the electric motor 11 after speed reduction by the speed reduction mechanism 3, to the right and left rear wheels 107R, 107L while allowing differential rotations.

The differential case 40 is supported so as to be rotatable relative to the housing 2, by a bearing 201 disposed between the differential case 40 and the first housing element 20 and a bearing 301 disposed between the differential case 40 and the rotation force applying member 30. The disc-shaped first flange 401 is formed integrally with one axial end of the differential case 40. The disc-shaped second flange 402 is disposed so as to be opposed to the first flange 401. The first flange 401 and the second flange 402 are connected to each other by the output members 33 of the speed reduction mechanism 3 so as to be non-rotatable relative to each other and immovable in the axial direction.

Out of the side gears 43, the left rear wheel 107L-side side gear 43 is connected to the left rear wheel 107L-side rear axle shaft 106L so as to be non-rotatable relative to the rear axle shaft 106L. Furthermore, out of the side gears 43, the right rear wheel 107R-side side gear 43 is connected to the first intermediate shaft 44 so as to be non-rotatable relative to the first intermediate shaft 44.

The linkage mechanism 5 includes the electric motor 50, a cylindrical sleeve 51 and a gear transmission mechanism 52. The sleeve 51 is advanced and retracted in the axial direction by driving force generated by the electric motor 50. The gear transmission mechanism 52 converts the driving force output from the electric motor 50 into movement force in the axial direction, and transmits the force to the sleeve 51. The electric motor 50 is controlled by the control unit 10 (shown in FIG. 1), and the rotation direction of the electric motor 50 is changed according to the direction of the current supplied from the control unit 10. As the sleeve 51 advances or retracts, the linkage mechanism 5 connects the first intermediate shaft 44 to a second intermediate shaft 45 that is rotatable relative to the first intermediate shaft 44 on the same axis as the first intermediate shaft 44, or disconnects the first intermediate shaft 44 from the second intermediate shaft 45.

One end portion of the first intermediate shaft 44 is connected to the right rear wheel 107R-side side gear 43 of the rear differential 4. The other end portion of the first intermediate shaft 44 is supported by a bearing 232 that is disposed between the other end portion and the fourth housing element 23. An axial center portion of the first intermediate shaft 44 is housed in the insertion hole 112a of the motor shaft 112.

The second intermediate shaft 45 is disposed at a position closer to the shaft insertion hole 22a than the first intermediate shaft 44 in a direction along the rotation axis $O_1$. The second intermediate shaft 45 is supported by two bearing 223, 224 both of which are fitted to an inner face of the cylindrical portion 222 of the third housing element 22. The bearing 223 and the bearing 224 are arranged next to each other in the axial direction with an annular spacer 225 interposed therebetween, and are prevented from being removed by a stopper member 226. The stopper member 226 is fixed to an end face of the cylindrical portion 222 with bolts 227.

A first gear 521 formed of a cylindrical screw gear is fitted to a motor shaft 501 of the electric motor 50. The first gear 521 is in mesh with a second gear 522 formed of a rectangular parallelepiped rack. The second gear 522 is fixed to a side face of an annular movement force transmission member 523. Furthermore, a plurality of pillar-shaped guide members 524 is fixed to the movement force transmission member 523. The guide members 524 extend in the axial direction so as to be perpendicular to the side face of the movement force transmission member 523. Distal end portions of the guide members 524 are movably housed in guide holes 23b respectively formed at multiple locations in the fourth housing element 23. A radially inner end portion of the movement force transmission member 523 is fitted in an annular groove 51a that is formed in an outer peripheral face of the sleeve 51.

The first gear 521, the second gear 522, the movement force transmission member 523 and the guide members 524 constitute the gear transmission mechanism 52. The gear transmission mechanism 52 converts the torque of the motor shaft 501 into movement force that moves the movement force transmission member 523 in the axial direction, due to the mesh between the first gear 521 and the second gear 522. The movement force transmission member 523 that has received the movement force is guided in the axial direction to advance and retract the sleeve 51 in the axial direction, as the guide members 524 move in the guide holes 23b.

A plurality of spline teeth 510 is formed on an inner peripheral face of the sleeve 51. Furthermore, a plurality of spline teeth 440 is formed on an outer peripheral face of a second intermediate shaft 45-side end portion of the first intermediate shaft 44. In addition, a plurality of spline teeth 450 is formed on an outer peripheral face of a first intermediate shaft 44-side end portion of the second intermediate shaft 45.

The sleeve 51 advances and retracts between a first position (shown by a long dashed double-short dashed line in FIG. 2), at which the spline teeth 510 mesh with the spline teeth 440 of the first intermediate shaft 44 but do not mesh with the spline teeth 450 of the second intermediate shaft 45, and a second position (shown by a continuous line in FIG. 2), at which the spline teeth 510 mesh with both the spline teeth 440 and the spline teeth 450. The linkage mechanism 5 is configured such that the sleeve 51 moves from the first position to the second position when the electric motor 50 rotates in the forward rotation direction, and such that the sleeve 51 moves from the second position to the first position when the electric motor 50 rotates in the reverse rotation direction.

When the sleeve 51 is at the second position, the first intermediate shaft 44 and the second intermediate shaft 45 are connected to each other so as to be non-rotatable relative to each other. On the other hand, when the sleeve 51 is at the first position, the first intermediate shaft 44 and the second intermediate shaft 45 are disconnected from each other. Specifically, the linkage mechanism 5 is able to carry out switchover between a connected state where the first intermediate shaft 44 (a first rotary member on the electric motor 11 side) and the second intermediate shaft 45 (a second rotary member on the wheel side) are connected to each other so as to be non-rotatable relative to each other to transmit torque from the electric motor 11 to the wheel (the right rear wheel 107R), and a disconnected state where the first intermediate shaft 44 and the second intermediate shaft 45 are disconnected from each other.

Figure 4A:
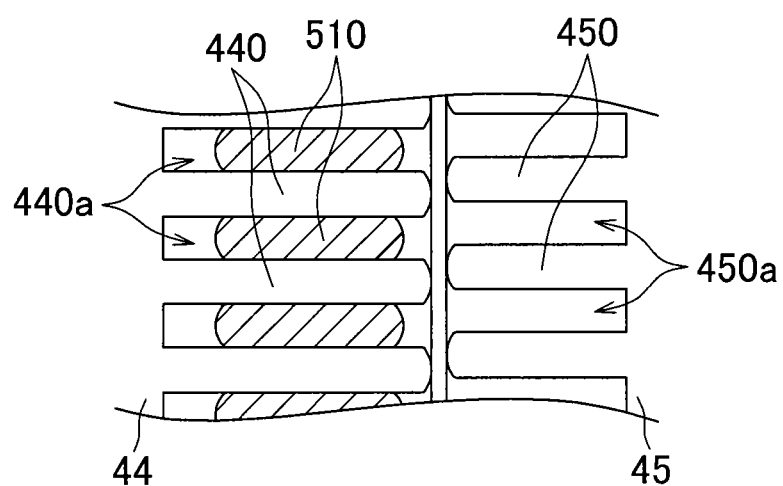
FIG. 4A and FIG. 4B are schematic diagrams showing operation states of a linkage mechanism.
Figure 4B:
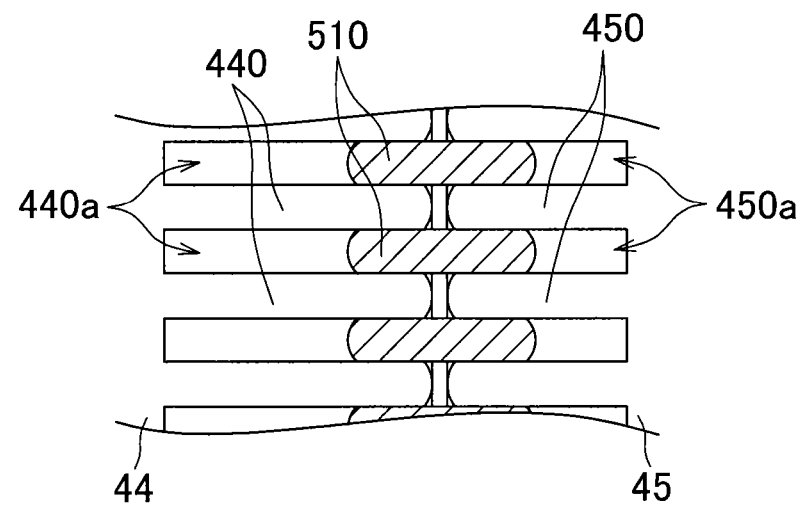

FIG. 4A and FIG. 4B are schematic diagrams showing the states of mesh between the spline teeth 510 of the sleeve 51, and the spline teeth 440 of the first intermediate shaft 44 and the spline teeth 450 of the second intermediate shaft 45. FIG. 4A shows the state where the sleeve 51 is at the first position. FIG. 4B shows the state where the sleeve 51 is at the second position.

As shown in FIG. 4A, when the sleeve 51 is at the first position, the spline teeth 510, which serve as protrusion portions, mesh with recessed portions 440a formed between the spline teeth 440 of the first intermediate shaft 44. At this time, the spline teeth 510 do not mesh with recessed portions 450a formed between the spline teeth 450 of the second intermediate shaft 45, so that the first intermediate shaft 44 and the second intermediate shaft 45 are rotatable relative to each other.

As shown in FIG. 4B, when the sleeve 51 is at the second position, one axial end portions of the spline teeth 510 mesh with the recessed portions 440a formed between the spline teeth 440 of the first intermediate shaft 44, and the other axial end portions of the spline teeth 510 mesh with the recessed portions 450a formed between the spline teeth 450 of the second intermediate shaft 45. In this state, the first intermediate shaft 44 and the second intermediate shaft 45 are not allowed to rotate relative to each other, and torque is transmitted between the first intermediate shaft 44 and the second intermediate shaft 45 via the sleeve 51. That is, the linkage mechanism 5 is formed as a dog clutch that connects the first intermediate shaft 44 and the second intermediate shaft 45 to each other by the meshing the spline teeth 510 of the sleeve 51 with the recessed portions 450a of the second intermediate shaft 45.

If large torque is transmitted between the sleeve 51 and the second intermediate shaft 45 when the sleeve 51 moves from the second position toward the first position, the movement of the sleeve 51 may be hindered by the force of friction that occurs at regions of contact between side faces of the spline teeth 510 of the sleeve 51 and side faces of the spline teeth 450 of the second intermediate shaft 45. In such a case, it is not possible to switch the driving force transmission apparatus 12 from the connected state to the disconnected state.

Examples of the case where torque is transmitted between the sleeve 51 and the second intermediate shaft 45 include the case where the four-wheel drive vehicle 100 is travelling using the driving force of the right and left front wheels 104R, 104L or coasting, with no motor current being supplied to the electric motor 11, and the case where the rotation output from the electric motor 11 is reduced in speed by the speed reduction mechanism 3 and then transmitted to the second intermediate shaft 45 via the rear differential 4 and the first intermediate shaft 44. In the former case, torque is transmitted from the second intermediate shaft 45 to the sleeve 51. Furthermore, in the latter case, torque is transmitted from the sleeve 51 to the second intermediate shaft 45.

Figure 5A:
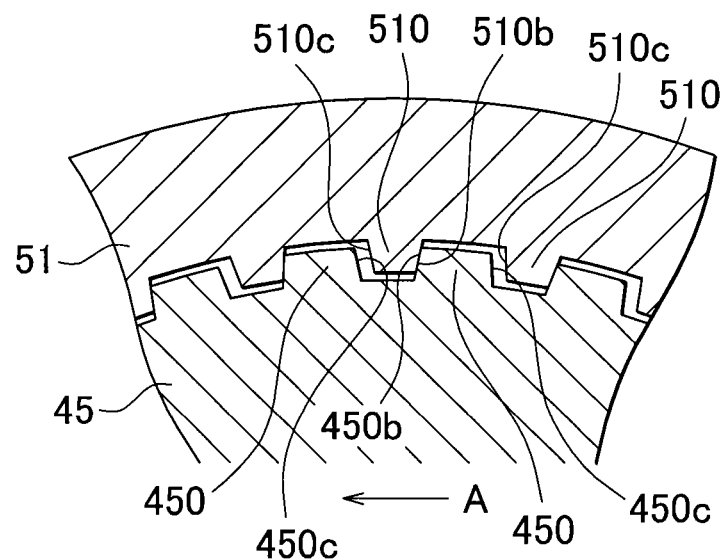
FIG. 5A and FIG. 5B are partially enlarged views of sections of a sleeve and a second intermediate shaft on a plane orthogonal to the axial direction.
Figure 5B:
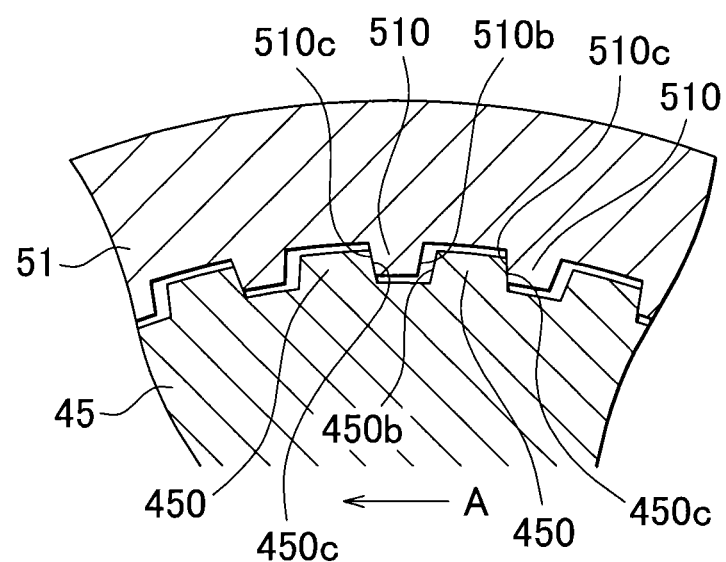

FIG. 5A and FIG. 5B are partially enlarged views of sections of the sleeve 51 and the second intermediate shaft 45 on a plane orthogonal to the axial direction. FIG. 5A shows a state where torque is being transmitted from the second intermediate shaft 45 to the sleeve 51. FIG. 5B shows a state where torque is being transmitted from the sleeve 51 to the second intermediate shaft 45. In these states, the rotation direction of the sleeve 51 and the rotation direction of the second intermediate shaft 45 are both the direction shown by an arrow A.

In the state where torque is transmitted from the second intermediate shaft 45 to the sleeve 51, first side faces 510b of the spline teeth 510 and first side faces 450b of the spline teeth 450 contact each other, so that torque is transmitted at regions of contact between the first side faces 510b and the first side faces 450b, as shown in FIG. 5A. Furthermore, in the state where torque is transmitted from the sleeve 51 to the second intermediate shaft 45, second side faces 510c of the spline teeth 510 and second side faces 450c of the spline teeth 450 contact each other, so that torque is transmitted at regions of contact between the second side faces 510c and the second side faces 450c, as shown in FIG. 5B. Note that, the side faces of the spline teeth mean surfaces that intersect with circumferential directions about the rotation axis $O_1$.

In the present embodiment, under the following control executed by the control unit 10, switchover from the connected state to the disconnected state is carried out with the force of friction between the spline teeth 510 and the spline teeth 450 reduced. Thus, the movement of the sleeve 51 by the driving force generated by the electric motor 50 in the linkage mechanism 5 is facilitated.

At the time of switching the driving force transmission apparatus 12 from the connected state to the disconnected state, the control unit 10 reduces the torque that is generated by the electric motor 11, in a drive state where torque output from the electric motor 11 is transmitted from the first intermediate shaft 44 (sleeve 51) to the second intermediate shaft 45. In the state where the torque that is generated by the electric motor 11 has been reduced, the control unit 10 controls the linkage mechanism 5 to switch the driving force transmission apparatus 12 from the connected state to the disconnected state. Next, an example of a concrete process executed by the control unit 10 will be described with reference to a flowchart in FIG. 6.

Figure 6:
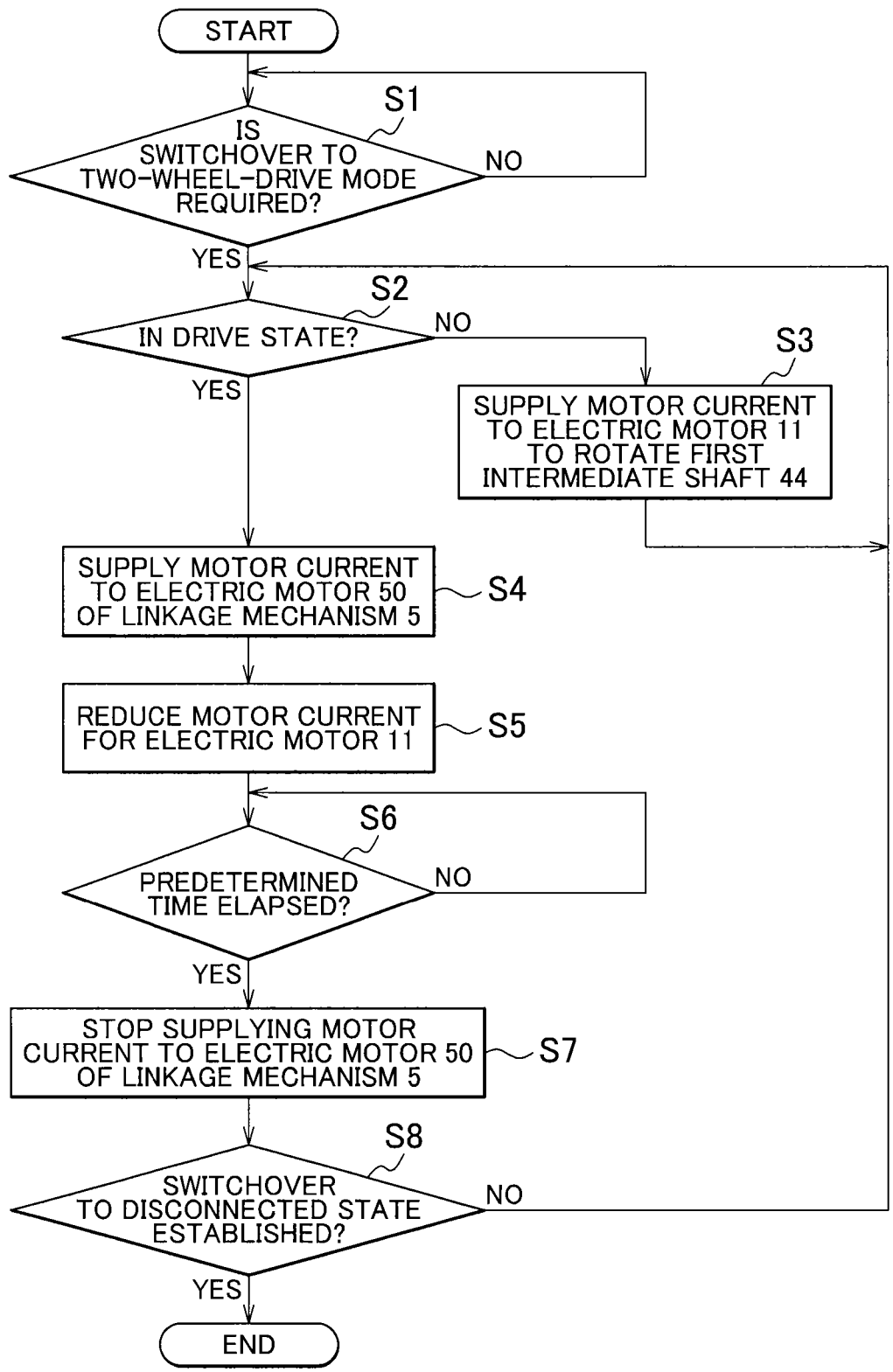
FIG. 6 is a flowchart showing an example of a process that is executed by a control unit.

FIG. 6 is the flowchart showing an example of a process that is executed by the control unit 10 to carry out switchover from the four-wheel-drive mode to the two-wheel-drive mode.

The control unit 10 determines whether to switch the drive mode to the two-wheel-drive mode (step S1). The determination may be made, for example, on the basis of whether the difference between the average rotational speed of the right and left front wheels 104R, 104L and the average rotational speed of the right and left rear wheels 107R, 107L is less than or equal to a predetermined value. Alternatively, the determination may be made on the basis of the amount of operation of the accelerator pedal performed by a driver, the vehicle speed or the steering angle. More specifically, the control unit 10 may determine that the vehicle should be switched to the two-wheel-drive mode, for example, in a steady travelling state during which the vehicle speed is substantially constant and the vehicle is travelling straight.

If it is determined in step S1 that the vehicle should be switched to the two-wheel-drive mode (YES in S1), the control unit 10 determines whether the driving force transmission apparatus 12 is in the drive state (step S2). The drive state is a state where torque output from the electric motor 11 is transmitted from the first intermediate shaft 44 to the second intermediate shaft 45 via the sleeve 51.

The control unit 10 determines whether the driving force transmission apparatus 12 is in the drive state, on the basis of, for example, the motor current for the electric motor 11 and the rotational speed of the electric motor 11 detected by the resolver 118. That is, the control unit 10 determines that the driving force transmission apparatus 12 is in the drive state, for example, when the electric motor 11 is being supplied with a current that is larger than the current that is needed in order to rotate the first intermediate shaft 44 at the rotational speed detected by the resolver 118 during the state where the first intermediate shaft 44 and the second intermediate shaft 45 are not connected to each other.

If it is determined in step S2 that the driving force transmission apparatus 12 is not in the drive state (NO in S2), that is, if the driving force transmission apparatus 12 is in a coasting state where the electric motor 11 is being rotated by turning force of the right and left rear wheels 107R, 107L, which is generated as the four-wheel drive vehicle 100 travels, the control unit 10 supplies the electric motor 11 with motor current so as to rotate the first intermediate shaft 44 (step S3). After that, the determination in step S2 is carried out again. Until the drive state is achieved, the control unit 10 continues supplying motor current to the electric motor 11 so as to increase the torque that is output from the electric motor 11.

If it is determined in step S2 that the driving force transmission apparatus 12 is in the drive state (YES in S2), the control unit 10 supplies motor current to the electric motor 50 of the linkage mechanism 5 (step S4). Thus, the sleeve 51 is urged in such a direction as to move from the second position to the first position. However, at this stage, the sleeve 51 may fail to move to the first position, due to force of friction between the spline teeth 510 and the spline teeth 450. That is, in some cases, even if the electric motor 50 is supplied with motor current, the sleeve 51 does not move to the first position.

Next, the control unit 10 reduces the motor current that is supplied to the electric motor 11, to a motor current that is smaller than the motor current supplied to the electric motor 11 when it is determined in step S2 that the driving force transmission apparatus 12 is in the drive state (step S5). Note that, the execution sequence of step S4 and step S5 may be reversed. That is, after the motor current that is supplied to the electric motor 11 is reduced, motor current may be supplied to the electric motor 50 of the linkage mechanism 5.

Next, the control unit 10 determines whether a predetermined time has elapsed since the reduction of the motor current that is supplied to the electric motor 11 (step S6). If the predetermined time has elapsed (YES in S6), the control unit 10 stops supplying the motor current to the electric motor 50 (step S7), and then determines whether the first intermediate shaft 44 and the second intermediate shaft 45 have been disconnected from each other, that is, whether the switchover from the connected state to the disconnected state has been established (step S8).

Note that, "predetermined time" in step S6 is set to a time that is longer than the length of time that is required for the rotational speed of the first intermediate shaft 44 to become lower than the rotational speed of the second intermediate shaft 45 by a predetermined amount in the case where the switchover to the disconnected state has been normally carried out. Furthermore, whether the switchover from the connected state to the disconnected state has been established can be determined, for example, on the basis of whether the difference between the rotational speed of the first intermediate shaft 44 and the rotational speed of the second intermediate shaft 45 is greater than or equal to a predetermined value. Note that, the control unit 10 can calculate the rotational speed of the first intermediate shaft 44 on the basis of the rotational speed of the electric motor 11 detected by the resolver 118, while taking into account, for example, the speed reduction ratio α of the speed reduction mechanism 3. Furthermore, the rotational speed of the second intermediate shaft 45 can be detected on the basis of the rotational speed of the right rear wheel 107R.

If the control unit 10 determines in step S8 that the switchover to the disconnected state has been established (YES in S8), the control unit 10 ends the process of the flowchart shown in FIG. 6. On the other hand, if it is determined in step S8 that the switchover to the disconnected state has failed to be established (NO in S8), the control unit 10 executes again the process in step S2 and the following processes. That is, when the switchover from the connected state to the disconnected state through the control of the linkage mechanism 5 has failed to be established, the control unit 10 executes again the process of bringing about the drive state where torque output from the electric motor 11 is transmitted from the first intermediate shaft 44 to the second intermediate shaft 45, reducing the torque that is output from the electric motor 11, and then controlling the linkage mechanism 5 so as to switch the driving force transmission apparatus 12 from the connected state to the disconnected state while the torque of the electric motor 11 has been reduced.

Figure 7A:
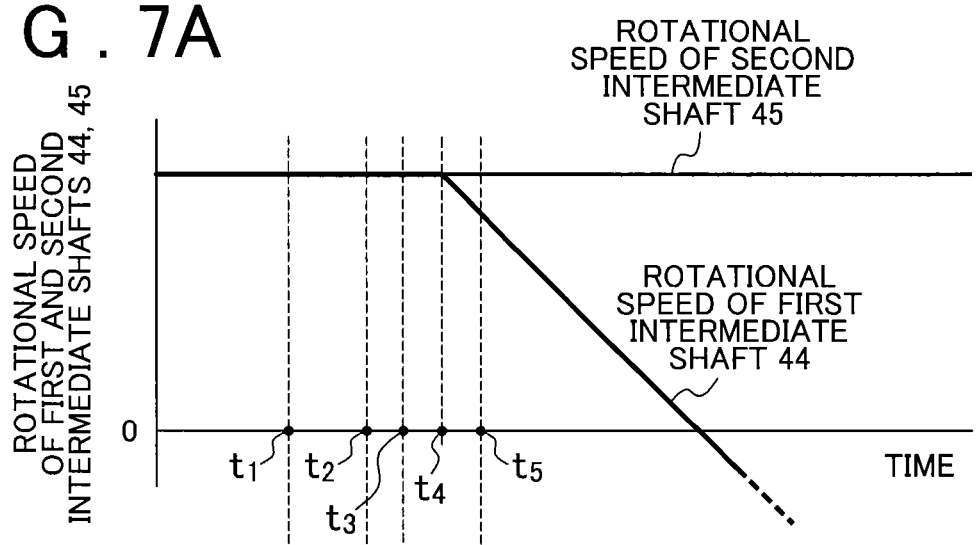
FIG. 7A to FIG. 7C are time charts showing an example of the operation of the drive apparatus during switchover from a four-wheel-drive mode to a two-wheel-drive mode.
Figure 7B:
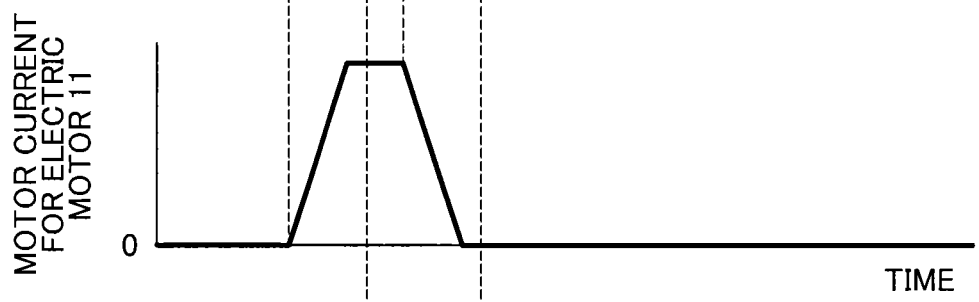
Figure 7C:
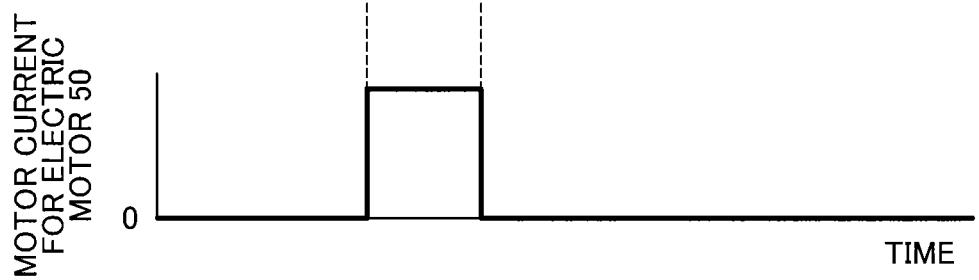

FIG. 7A to FIG. 7C are time charts illustrating the case where, at the time of switchover from the four-wheel-drive mode to the two-wheel-drive mode, the switchover from the connected state where the first intermediate shaft 44 and the second intermediate shaft 45 are connected to each other, to the connected state is established on the first attempt. FIG. 7A shows changes in the rotational speeds of the first intermediate shaft 44 and the second intermediate shaft 45. FIG. 7B shows changes in the motor current for the electric motor 11. FIG. 7C shows changes in the motor current for the electric motor 50. In FIG. 7A to FIG. 7C, the abscissa axes show time. Note that, in the following description, the processes executed by the control unit 10 at respective time points will be indicated by step numbers of the flowchart of FIG. 6 mentioned in parentheses.

In the example shown by FIG. 7A to FIG. 7C, prior to time $t_1$, the motor current for the electric motor 11 is zero, the first intermediate shaft 44 and the second intermediate shaft 45 are connected to each other so as to be non-rotatable relative to each other, and the electric motor 11 is rotated by the turning forces of the right and left rear wheels 107R, 107L.

If the control unit 10 determines at time $t_1$ that the vehicle 100 should be switched to the two-wheel-drive mode (step YES in S1), the control unit 10 determines whether the driving force transmission apparatus 12 is in the drive state (step S2). In the example shown by FIG. 7A to FIG. 7C, at time $t_1$, the vehicle 100 is in the coasting state where the electric motor 11 is rotated by the turning forces of the right and left rear wheels 107R, 107L. Therefore, a negative determination is made (NO in S2), so that the control unit 10 starts supplying motor current to the electric motor 11 (step S3). After that, the motor current for the electric motor 11 increases. If it is determined at time $t_2$ that the driving force transmission apparatus 12 is in the drive state (YES in S2), the control unit 10 supplies motor current to the electric motor 50 of the linkage mechanism 5 (step S4) and, at time $t_3$, reduces the motor current for the electric motor 11 (step S5).

Because the motor current for the electric motor 11 is reduced, the torque output from the electric motor 11 decreases and therefore the surface pressure at the regions of contact between the second side faces 510c of the spline teeth 510 and the second side faces 450c of the spline teeth 450a becomes lower. Correspondingly, the force of friction acting between the spline teeth 510 and the spline teeth 450 decreases. Therefore, the resistance force that hinders the movement of the sleeve 51 becomes smaller, and therefore the sleeve 51 moves more easily from the second position toward to the first position. When the resistance force based on the force of friction acting between the spline teeth 510 and the spline teeth 450 becomes smaller than the force which is based on the driving force generated by the electric motor 50 and with which the sleeve 51 is urged toward the first position, the sleeve 51 begins to move from the second position toward the first position.

As shown in FIG. 7A, if the sleeve 51 moves from the second position to the first position and the first intermediate shaft 44 and the second intermediate shaft 45 are disconnected from each other at time $t_4$, the rotational speed of the first intermediate shaft 44 becomes lower than the rotational speed of the second intermediate shaft 45 and gradually decreases because the motor current for the electric motor 11 has been reduced. Furthermore, at time $t_5$, at which the predetermined time has elapsed since time $t_3$, the control unit 10 stops supplying motor current to the electric motor 50 of the linkage mechanism 5 (step S7), and determines whether the switchover to the disconnected state has been established (step S8). In the example shown in FIG. 7A to FIG. 7C, at time $t_5$ there is a difference between the rotational speed of the first intermediate shaft 44 and the rotational speed of the second intermediate shaft 45, the control unit 10 determines that the switchover to the disconnected state has been established (YES in S8), and then ends the process.

Figure 8A:
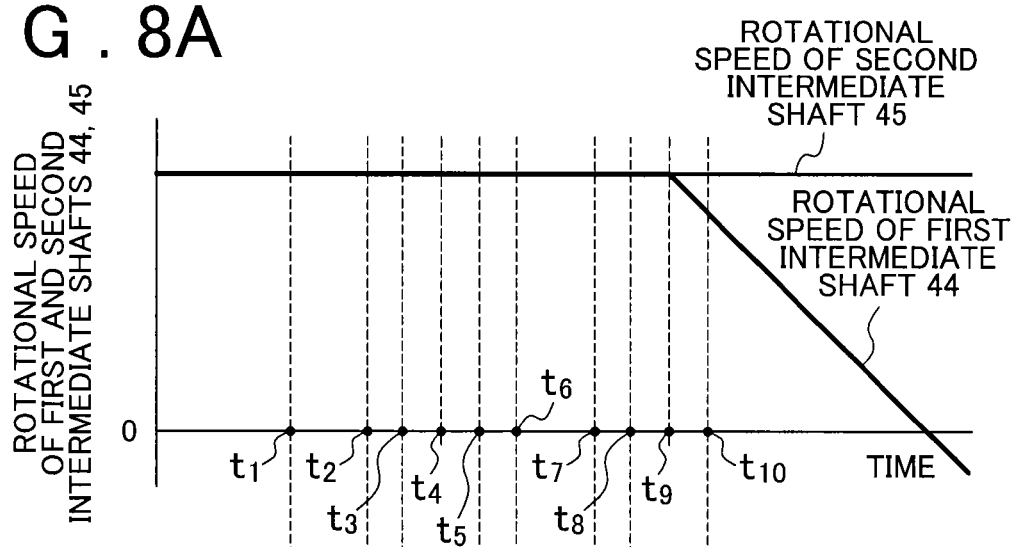
FIG. 8A to FIG. 8C are time charts showing another example of the operation of the drive apparatus during switchover from the four-wheel-drive mode to the two-wheel-drive mode.
Figure 8B:
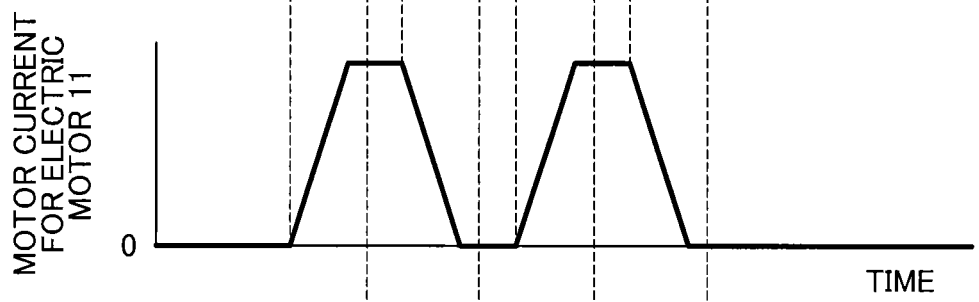
Figure 8C:
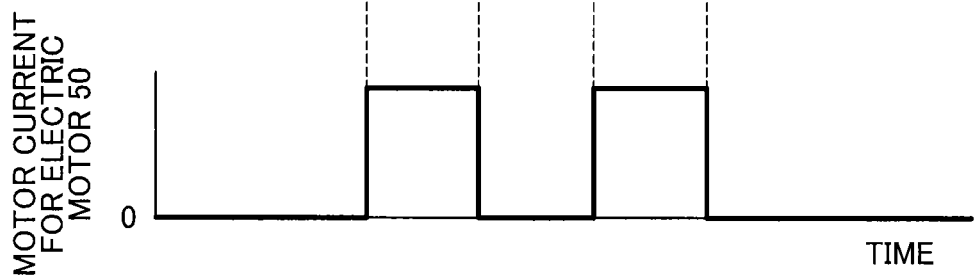

FIG. 8A to FIG. 8C are time charts illustrating the case where, at the time of switchover from the four-wheel-drive mode to the two-wheel-drive mode, the switchover from the connected state where the first intermediate shaft 44 and the second intermediate shaft 45 are connected to each other to the disconnected state fails to be established on the first attempt, and then is successfully established on the second attempt. FIG. 8A shows changes in the rotational speeds of the first intermediate shaft 44 and the second intermediate shaft 45. FIG. 8B shows changes in the motor current for the electric motor 11. FIG. 8C shows changes in the motor current for the electric motor 50.

In the time charts shown in FIG. 8A to FIG. 8C, the operations of the control unit 10 up to time $t_5$ are the same as described above with reference to FIG. 7A to FIG. 7C. If the control unit 10 determines at time $t_5$ that the switchover to the disconnected state has resulted in establishment failure (NO in S8), the control unit 10 starts again, at time $t_6$, the supply of motor current to the electric motor 11 (step S3) so as to increase the torque output from the electric motor 11. After that, if it is determined at time $t_7$ that the driving force transmission apparatus 12 is in the drive state (YES in S2), the control unit 10 supplies motor current to the electric motor 50 of the linkage mechanism 5 (step S4) and, at time $t_8$, reduces the motor current for the electric motor 11 (step S5). Note that, the rate of reduction in the motor current for the electric motor 11 (the amount of reduction in the motor current per unit time) in this case may be lower than the rate of reduction in the motor current during the period from time $t_3$ to time $t_5$. That is, the motor current may be reduced more moderately than in the first reduction period.

If the sleeve 51 moves from the second position to the first position and therefore the first intermediate shaft 44 and the second intermediate shaft 45 are disconnected from each other at time $t_9$, the rotational speed of the first intermediate shaft 44 becomes lower than the rotational speed of the second intermediate shaft 45 and gradually decreases. The control unit 10 stops supplying motor current to the electric motor 50 of the linkage mechanism 5 at time $t_{10}$ (step S7), at which the predetermined time elapses following time t8, and then determines whether the switchover to the disconnected state has been established (step S8). In the example shown in FIG. 8A to FIG. 8C, because there is a difference between the rotational speed of the first intermediate shaft 44 and the rotational speed of the second intermediate shaft 45 at time $t_{10}$, the control unit 10 determines in step S8 that the switchover to the disconnected state has been established (YES in S8), and then ends the process.

According to the embodiment described above, advantageous effects mentioned below are obtained.

(1) The sleeve 51 is moved from the second position to the first position while the torque output from the electric motor 11 has been made lower than the torque in the drive state. As a result, the driving force of the electric motor 50 of the linkage mechanism 5, which is required to move the sleeve 51, becomes lower than that in the case where the sleeve 51 is moved while the drive state is maintained, or while the motor current for the electric motor 11 is zero. Thus, it is possible to smoothly carry out the switchover from the connected state to the disconnected state while suppressing increases in cost and weight of the driving force transmission apparatus 12.

(2) The movement of the sleeve 51 from the second position to the first position, that is, the switchover from the connected state to the disconnected state, is carried out while the torque output from the electric motor 11 has been reduced. As a result, the impact at the time of the switchover becomes smaller. That is, for example, in the case where the first intermediate shaft 44 and the second intermediate shaft 45 are disconnected from each other by moving the sleeve 51 in the state where the motor current of the electric motor 11 is zero, impact may occur as the rotational speed of the first intermediate shaft 44 greatly fluctuates before and after the disconnection. However, in the foregoing embodiment, the first intermediate shaft 44 and the second intermediate shaft 45 are disconnected from each other during the process in which the rotational speed of the first intermediate shaft 44 is gradually decreased by reducing the torque that is output from the electric motor 11.

(3) The driving force transmission apparatus 12 disconnects the first intermediate shaft 44 connected to the side gear 43 of the rear differential 4 and the second intermediate shaft 45 connected to the rear axle shaft 106R from each other. Thus, the four-wheel drive vehicle 100 is switched to the two-wheel-drive mode. Therefore, the linkage mechanism 5 is made more compact than that, for example, in the case where the flange 401 of the differential case 40 of the rear differential 4 and the main portion of the differential case 40 (a portion that houses the pinions 42 and the side gears 43) are disconnected from each other.

The drive apparatus 1 according to the invention has been described with reference to the embodiment. However, the invention is not limited to the foregoing embodiment, and may be carried out in various other embodiments within the scope of the invention. For example, the following modifications may be made.

(1) In the above-described embodiment, the electric motor 50 is used as a drive source for the linkage mechanism 5. However, this does not limit the invention. For example, the sleeve 51 of the linkage mechanism 5 may be moved by hydraulic pressure.

(2) In the above-described embodiment, the driving force transmission apparatus 12 is configured so as to disconnect the first intermediate shaft 44 and the second intermediate shaft 45 from each other during the two-wheel-drive mode. However, this does not limit the invention. For example, the driving force transmission apparatus 12 may be configured, for example, so as to disconnect the flange 401 of the differential case 40 of the rear differential 4 and the main portion of the differential case 40 from each other.

(3) In the above-described embodiment, the speed reduction mechanism 3 is formed as an involute-gear speed reduction mechanism with a small teeth number difference. However, this does not limit the invention. For example, a planetary gear mechanism may be employed as the speed reduction mechanism 3.

(4) In the above-described embodiment, the driving force transmission apparatus 12 is configured such that the rotation axis $O_1$ of the electric motor 11 and the rotation axis of the first intermediate shaft 44 and the second intermediate shaft 45 coincide with each other and the first intermediate shaft 44 extends through the inside of the motor shaft 112. However, this does not limit the invention. For example, the driving force transmission apparatus 12 may be configured such that the electric motor 11 is disposed outside the housing 2 and torque output from the electric motor 11 is input into the speed reduction mechanism 3 via a sprocket or a gear mechanism.

(5) In the above-described embodiment, the spline teeth 510 of the sleeve 51 are always in mesh with the recessed portions 440 of the first intermediate shaft 44 and, during the connected state, the spline teeth 510 of the sleeve 51 mesh with the recessed portions 450 of the second intermediate shaft 45 as well. However, the linkage mechanism 5 may be configured such that the spline teeth 510 of the sleeve 51 are always in mesh with the recessed portions 450 of the second intermediate shaft 45 and, during the connected state, the spline teeth 510 of the sleeve 51 mesh with the recessed portions 440 of the first intermediate shaft 44 as well. Furthermore, the end faces of the first intermediate shaft 44 and the second intermediate shaft 45, which face each other, may be provided with flanges that have spline teeth, and the first intermediate shaft 44 and the second intermediate shaft 45 may be connected to each other by causing the spline teeth of the flanges to mesh with each other. In this case, the first intermediate shaft 44 and the second intermediate shaft 45 can be disconnected from each other by moving the first intermediate shaft 44 and the second intermediate shaft 45 relative to each other in the axial direction so that the first intermediate shaft 44 and the second intermediate shaft 45 move apart from each other.

With the vehicle drive apparatus according to the invention, it is possible to switch the rotary member that transmits driving force, from the connected state to the disconnected state while suppressing increases in cost and weight of the apparatus.

What is claimed is:

1. A vehicle drive apparatus, comprising:
   a motor that generates torque used as driving force for a vehicle;
   a driving force transmission apparatus that transmits torque output from the motor to a wheel; and
   a control unit that controls the motor and the driving force transmission apparatus, wherein:
   the driving force transmission apparatus includes a linkage mechanism that carries out switchover between a connected state where a first rotary member on the motor side and a second rotary member on the wheel side are connected to each other so as to be non-rotatable relative to each other to transmit the torque output from the motor to the wheel, and a disconnected state where the first rotary member and the second rotary member are disconnected from each other; and
   when switching the driving force transmission apparatus from the connected state to the disconnected state, the control unit reduces the torque that is generated by the motor by reducing a current that is supplied to the motor during a drive state where the torque output from the motor is transmitted from the first rotary member to the second rotary member, and switches the driving force transmission apparatus from the connected state to the disconnected state to switch from a four-wheel-drive mode of the vehicle to a two-wheel-drive mode of the vehicle by controlling the linkage mechanism while the torque that is generated by the motor has been reduced.

2. The vehicle drive apparatus according to claim 1, wherein:
   the linkage mechanism is a dog clutch that connects the first rotary member and the second rotary member to each other by meshing of a recessed portion formed at one of the first rotary member and the second rotary member with a protrusion portion formed at the other one of the first rotary member and the second rotary member; and
   when switchover from the connected state to the disconnected state through control of the linkage mechanism is not established, the control unit reduces the torque that is generated by the motor after bringing about the drive state in which the torque output from the motor is transmitted from the first rotary member to the second rotary member again, and switches the driving force transmission apparatus from the connected state to the disconnected state by controlling the linkage mechanism while the torque that is generated by the motor has been reduced.

3. The vehicle drive apparatus according to claim 2, wherein:
   the driving force transmission apparatus includes a differential gear mechanism that transmits the torque output from the motor to a right wheel and a left wheel of the vehicle while allowing differential movements of the right wheel and the left wheel;
   the first rotary member is connected to one output member out of a pair of output members of the differential gear mechanism; and
   the second rotary member is connected to one of the right wheel and the left wheel, the one of the wheels being a wheel to which the torque output from the motor is transmitted via the one output member.

4. The vehicle drive apparatus according to claim 1, wherein:
   the driving force transmission apparatus includes a differential gear mechanism that transmits the torque output from the motor to a right wheel and a left wheel of the vehicle while allowing differential movements of the right wheel and the left wheel;
   the first rotary member is connected to one output member out of a pair of output members of the differential gear mechanism; and
   the second rotary member is connected to one of the right wheel and the left wheel, the one of the wheels being a wheel to which the torque output from the motor is transmitted via the one output member.

5. The vehicle drive apparatus according to claim 1, wherein:
   the linkage mechanism includes a sleeve surrounding at least one of the first rotary member and the second rotary member, and the sleeve is linearly movable along an axial direction of the first rotary member and along an axial direction of the second rotary member.

6. The vehicle drive apparatus according to claim 1, wherein:
   the motor is an electric motor.

7. A vehicle drive apparatus, comprising:
   a motor that generates torque used as driving force for a vehicle;
   a driving force transmission apparatus that transmits torque output from the motor to a wheel; and
   circuitry configured to control the motor and the driving force transmission apparatus, wherein:
   the driving force transmission apparatus includes a linkage mechanism that carries out switchover between a connected state where a first rotary structure on the motor side and a second rotary structure on the wheel side are connected to each other so as to be non-rotatable relative to each other to transmit the torque output from the motor to the wheel, and a disconnected state where the first rotary structure and the second rotary structure are disconnected from each other; and
   when switching the driving force transmission apparatus from the connected state to the disconnected state, the circuitry is configured to reduce the torque that is generated by the motor by reducing a current that is supplied to the motor during a drive state where the torque output from the motor is transmitted from the first rotary structure to the second rotary structure, and to switch the driving force transmission apparatus from the connected state to the disconnected state to switch from a four-wheel-drive mode of the vehicle to a two-wheel-drive mode of the vehicle by controlling the linkage mechanism while the torque that is generated by the motor has been reduced.

* * * * *